D. Russell.
Harvester Cutter
No. 12327
Patented Jan. 30, 1855.
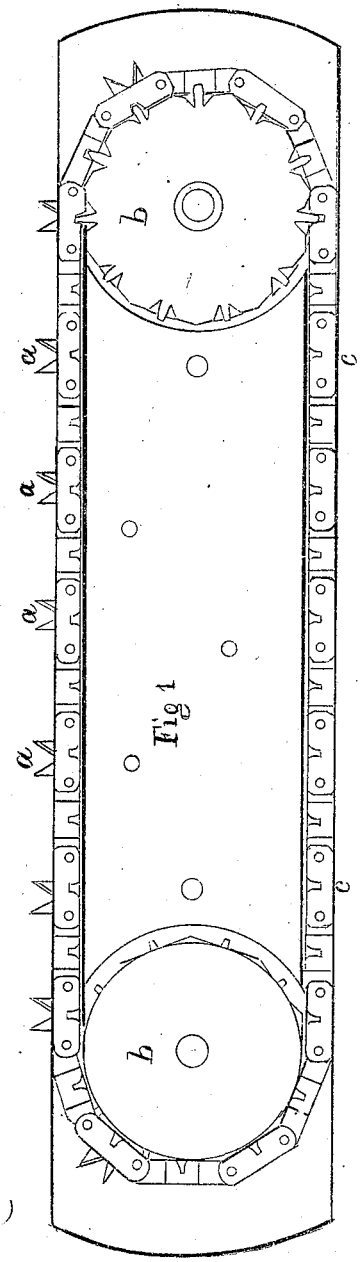
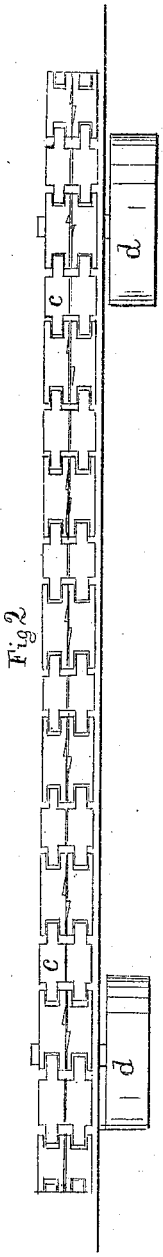
Witnesses
Sam Grubb
John F. Clark
David Russell

UNITED STATES PATENT OFFICE.

DAVID RUSSELL, OF DREWERSBURG, INDIANA.

IMPROVEMENT IN HARVESTER-CUTTERS.

Specification forming part of Letters Patent No. 12,327, dated January 30, 1855.

*To all whom it may concern:*

Be it known that I, DAVID RUSSELL, of Drewersburg, in the county of Franklin and State of Indiana, have invented a new and useful Improvement in Cutters for Harvesters; and I do hereby declare that the following is a full and exact description thereof, reference being had to the accompanying drawings, making a part of this specification.

Figure 1 is a top view of the wheels, chains, and cutters with the top of the case removed. Fig. 2 is an edge view of the case, showing the driving-pulleys $d\ d$ below.

To enable others skilled in the art to make and use my invention, I will proceed to describe its construction and operation.

I construct my improved cutters out of any of the ordinary materials used for such purpose, and the endless chain may be either a chain, strap, or rope, or all combined.

Letters $a\ a\ a\ a$, Fig. 1, are the cutters.
Letters $b\ b$, Fig. 1, are the wheels.
Letters $c\ c$, Figs. 1 and 2, are the chains.
Letters $d\ d$, Fig. 2, are the pulleys.

The cutters $a\ a\ a\ a$ are let into the chains on the inner sides by dovetailing them in and fastening them by screws, making the chains a smooth surface after the cutters are let in. The driving-pulleys $d\ d$ are attached to the shaft passing through the cog-wheels $b\ b$, over which the endless chains play, and as they revolve reversely to each other the knives pass over each other in the form of shears, cutting all the grain caught in their grasp, and the rapidity with which they move is constantly cutting the grain as fast as the machine is moved along. The cutters are put at a given distance of eight or ten inches from each other on each chain.

Having thus fully described the nature and operation of my improvement, what I claim as my invention, and desire to secure by Letters Patent, is—

The combination of cutters with an endless chain or chains operating as described, and for the purposes set forth in my specification.

DAVID RUSSELL.

Witnesses:
SAML. GRUBB,
T. GREER CLAYTON.